(12) United States Patent
Wang et al.

(10) Patent No.: US 10,846,919 B2
(45) Date of Patent: Nov. 24, 2020

(54) EYE IMAGE GENERATION METHOD AND APPARATUS

(71) Applicant: Tencent Technology (Shenzhen) Company Limited, Guangdong (CN)

(72) Inventors: Qiang Wang, Guangdong (CN); Bailin An, Guangdong (CN); Chen Chen, Guangdong (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 212 days.

(21) Appl. No.: 15/972,702

(22) Filed: May 7, 2018

(65) Prior Publication Data

US 2018/0253892 A1    Sep. 6, 2018

Related U.S. Application Data

(63) Continuation of application No. PCT/CN2017/076104, filed on Mar. 9, 2017.

(30) Foreign Application Priority Data

Mar. 10, 2016    (CN) .......................... 2016 1 0136094

(51) Int. Cl.
    *G06T 15/50*    (2011.01)
    *G06T 13/40*    (2011.01)
    (Continued)

(52) U.S. Cl.
    CPC ............ *G06T 15/506* (2013.01); *A63F 13/25* (2014.09); *G06T 13/40* (2013.01); *G06T 15/04* (2013.01)

(58) Field of Classification Search
    None
    See application file for complete search history.

(56) References Cited

U.S. PATENT DOCUMENTS

| 6,771,264 B1 | 8/2004 | Duluk et al. |
| 2005/0250579 A1* | 11/2005 | Birdwell ................. A63F 13/10 |
| | | 463/33 |

(Continued)

FOREIGN PATENT DOCUMENTS

| CN | 102749991 A | 10/2012 |
| CN | 103632389 A | 3/2014 |

(Continued)

OTHER PUBLICATIONS

Office Action dated Jul. 9, 2019 for Korean Application No. 10-2018-7016034, 7 pages.

(Continued)

*Primary Examiner* — Frank S Chen
(74) *Attorney, Agent, or Firm* — Brinks Gilson & Lione (57) ABSTRACT

The present disclosure discloses an eye image generation method and apparatus. The method includes obtaining an eye model used for generating an eye image. The eye includes an eyeball part for generating an eyeball image and expressing the eyeball of an eye. The method also includes providing a map on an eyeball surface of the eyeball part in the eye model, the map covering the eyeball part in the eye model, and the map being used for simulating a bumpy texture of a surface of a cornea of the eye. The method further includes rendering the eye model on which the map is provided, to obtain the eye image. The present disclosure resolves a technical problem that eyes of a character are not vivid and realistic in an online game.

14 Claims, 5 Drawing Sheets

(51) Int. Cl.
*A63F 13/25* (2014.01)
*G06T 15/04* (2011.01)

(56) References Cited

U.S. PATENT DOCUMENTS

| | | | | |
|---|---|---|---|---|
| 2007/0046665 | A1* | 3/2007 | Nakagawa | G06T 15/50 345/426 |
| 2014/0267342 | A1* | 9/2014 | Liu | G06T 11/001 345/581 |
| 2016/0364904 | A1* | 12/2016 | Parker | G06F 3/038 |
| 2017/0213385 | A1* | 7/2017 | Yu | G06K 9/4604 |

FOREIGN PATENT DOCUMENTS

| | | |
|---|---|---|
| CN | 104114080 A | 10/2014 |
| CN | 105391996 A | 3/2016 |
| JP | 2011-113421 A | 6/2011 |
| KR | 10-2012-0086755 A | 8/2012 |
| WO | WO 2010/129544 A1 | 11/2010 |
| WO | WO 2015-050250 A1 | 4/2015 |

OTHER PUBLICATIONS

First Office Action and Written Opinion in Chinese Application No. 201610136094.4, dated Sep. 30, 2018, pp. 1-8.
Second Office Action in Chinese Application No. 201610136094.4, dated Dec. 12, 2018, pp. 1-7.
International Search Report and Written Opinion for PCT Application No. PCT/CN2017/076104, dated Jun. 14, 2017, pp. 1-12.
Lichen Jing, "On the Application of 3D Technology in Filmmaking—A Case Study of Avatar" dated Dec. 15, 2013, vol. 1, No. S1, Chinese Master's Theses Full-Text Database Engineering Science and Technology II, obtained from the Internet at URL: <http://www.cmfd.cnki.net/Journal/Issue.aspx?dbCode=CMFD&Year=2013&Issue=S1&Volume=01&QueryID=4>, pp. 1-4.

* cited by examiner

FIG. 6

EYE IMAGE GENERATION METHOD AND APPARATUS

RELATED APPLICATION

This application is a continuation application of PCT Patent Application No. PCT/CN2017/076104, filed on Mar. 9, 2017, which claims priority to Chinese Patent Application No. 201610136094.4, entitled "EYE IMAGE GENERATION METHOD AND APPARATUS" filed with the Chinese Patent Office on Mar. 10, 2016, both of which are incorporated herein by reference in their entireties.

FIELD OF THE TECHNOLOGY

The present disclosure relates to the image field, and specifically, to an eye image generation method and apparatus.

BACKGROUND OF THE DISCLOSURE

In high-end stand-alone games, the realistic effect of eyes is achieved by using a huge rendering technology, a large number of surfaces of a model, and a complex program algorithm. The effect of eyelashes is achieved in a model insertion manner by using individual eyelashes, environmental reflection and highlight presentation on eyeballs are implemented by means of real-time calculus, and tear glands and secretions are produced by using an entity model.

In large-scale online games, the technologies for achieving the realistic effect of eyes in the high-end stand-alone games have very high costs. In addition, due to limitations of computer configurations used in ordinary online gamers, computers have limited bearing capabilities. Therefore, the technologies for achieving the realistic effect of eyeballs in the high-end stand-alone games cannot be used in the large-scale online games. In the large-scale online games, the problem is that eyes of characters are presented roughly, and are not very vivid and realistic.

No effective solutions are provided currently for the foregoing problem.

SUMMARY

Embodiments of the present disclosure provide an eye image generation method and apparatus, so as to resolve at least a technical problem that eyes of a character are not vivid and realistic in an online game.

According to an aspect of the embodiments of the present disclosure, an eye image generation method is provided, and the method includes obtaining, by a device comprising a memory and a processor in communication with the device, an eye model for generating an eye image of an eye, the eye model comprising an eyeball part for generating an eyeball image. The method also includes providing, by the device, a map on an eyeball surface of the eyeball part in the eye model, the map covering the eyeball part in the eye model, and the map being used for simulating a texture of a surface of a cornea of the eye. The method further includes rendering, by the device, the eye model on which the map is provided to obtain the eye image.

According to another aspect of the embodiments of the present disclosure, an eye image generation apparatus is provided. The apparatus includes a memory storing instructions and a processor in communication with the memory, wherein, when the processor executes the instructions, the processor is configured to cause the apparatus to obtain an eye model for generating an eye image of an eye, the eye model comprising an eyeball part for generating an eyeball image. When the processor executes the instructions, the processor is configured to further cause the apparatus to provide a map on an eyeball surface of the eyeball part in the eye model, the map covering the eyeball part in the eye model, and the map being used for simulating a texture of a surface of a cornea of the eye. When the processor executes the instructions, the processor is configured to further cause the apparatus to render the eye model on which the map is provided to obtain the eye image.

An embodiment of the present disclosure further provides a non-transitory computer readable storage medium storing instructions, the instructions, when executed by a processor, cause the processor to perform obtaining an eye model for generating an eye image of an eye, the eye model comprising an eyeball part for generating an eyeball image; providing a map on an eyeball surface of the eyeball part in the eye model, the map covering the eyeball part in the eye model, and the map being used for simulating a texture of a surface of a cornea of the eye; and rendering the eye model on which the map is provided to obtain the eye image.

In the embodiments of the present disclosure, the map is provided on the eyeball surface in the eye model to simulate the bumpy texture of the surface of the cornea in the eye, and the eye model on which the map is provided is rendered, to obtain the eye image including both an image of the eyeball and an image of the cornea. In this way, the eye image is closer to real eyes and is more vivid and realistic. In addition, because generation of an eye image does not require a large number of surfaces of a model or a complex program algorithm, when the eye image is displayed on a terminal, operating and calculating requirements of the terminal are lower, operating pressure and calculating pressure of the terminal are relieved, and the efficiency of displaying the eye image is improved, and thereby achieving technical effects that the eye image is closer to real eyes and is more vivid and realistic. Therefore, the present disclosure solves the technical problem that eyes of a character are not vivid in an online game and improves the computer-related technology in the application of on-line games.

BRIEF DESCRIPTION OF THE DRAWINGS

The accompanying drawings described herein are used for providing a further understanding of the present disclosure and constitute a part of this application. The exemplary embodiments of the present disclosure and descriptions thereof are used for explaining the present disclosure but do not constitute a limit to the present disclosure. In the accompanying drawings.

DESCRIPTION OF EMBODIMENTS

To make a person skilled in the art understand the solutions in the present disclosure better, the following describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

It should be noted that, terms such as "first" and "second" in this specification, the claims, and the accompanying drawings of the present disclosure are used to distinguish between similar objects, and are not necessarily for describing a particular order or a sequence. It should be understood that, data used in this way can be interchanged in an appropriate case, so that the embodiments of the present disclosure that are described herein can be implemented in a sequence other than those sequences illustrated or described herein. Moreover, the terms "include", "comprise", and any other variants mean to cover the non-exclusive inclusion, for example, a process, method, system, product, or device that includes a list of steps or units is not necessarily limited to those steps or units, but may include other steps or units not expressly listed or inherent to such a process, method, system, product, or device.

Embodiment 1

According to this embodiment of the present disclosure, an eye image generation method is provided.

Figure 1:
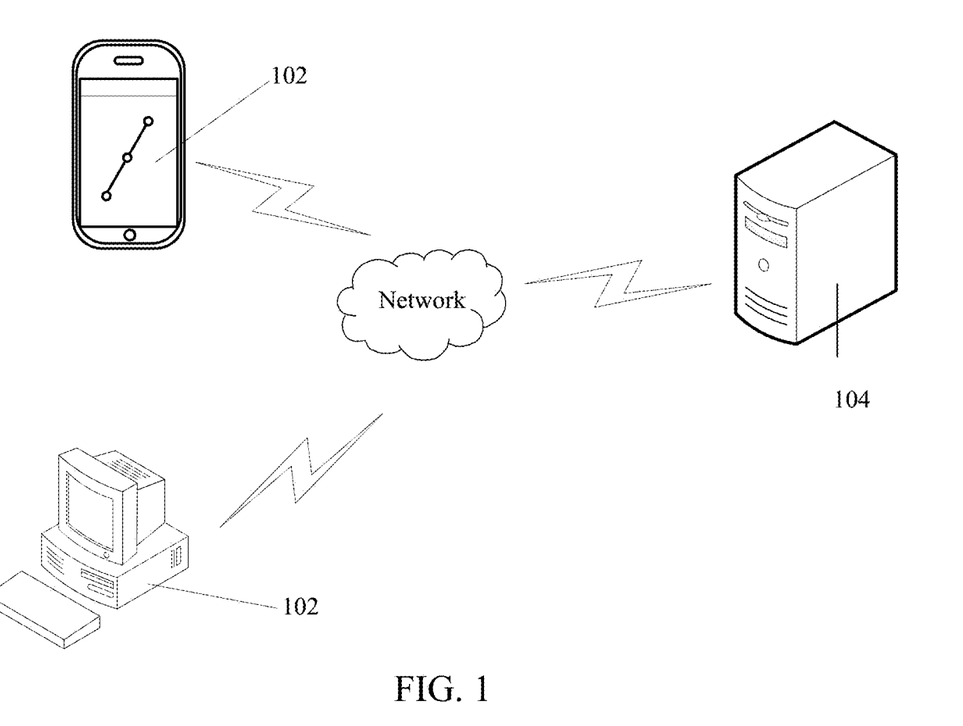
FIG. 1 is an architecture diagram of a hardware structure according to an embodiment of the present disclosure.

Optionally, in this embodiment, the eye image generation method may be applied to a hardware environment composed of a server 104 and a terminal 102 shown in FIG. 1. FIG. 1 is an architecture diagram of a hardware structure according to an embodiment of the present disclosure. As shown in FIG. 1, the server 104 connects to the terminal 102 by using a network. The network includes, but is not limited to, a wide area network, a metropolitan area network, or a local area network. The network may be wireless or wired network. The terminal 102 is not limited to a computer, a mobile phone, a tablet computer, and the like.

Figure 2:
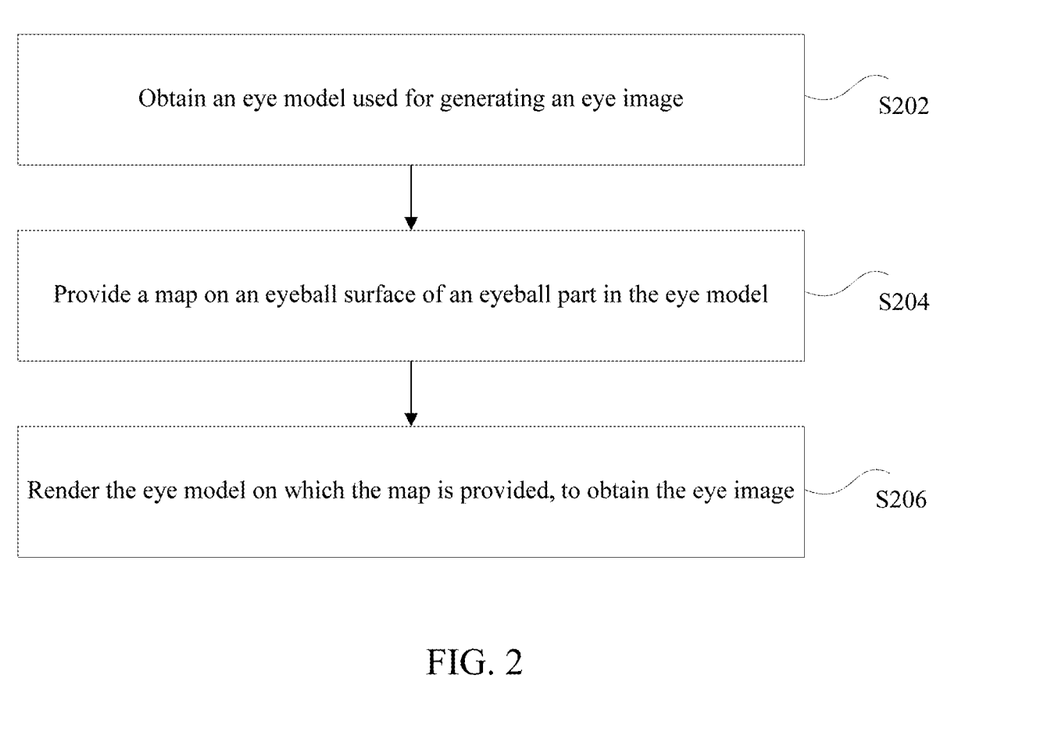
FIG. 2 is a flowchart of an eye image generation method according to an embodiment of the present disclosure.

FIG. 2 is a flowchart of the eye image generation method according to this embodiment of the present disclosure. As shown in FIG. 2, the eye image generation method includes the following steps:

Step S202: Obtain an eye model for generating an eye image, the eye model including an eyeball part for generating an eyeball image and/or expressing the eyeball of an eye.

Step S204: Provide a map on an eyeball surface of the eyeball part in the eye model, the map covering the eyeball part in the eye model, and the map being used for simulating a bumpy texture of a surface of a cornea of the eye.

Figure 3:
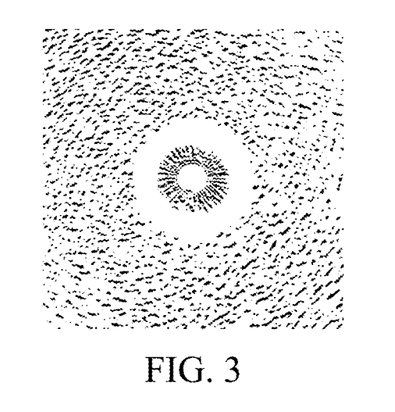
FIG. 3 is a schematic diagram of a cornea map according to an embodiment of the present disclosure.

An eye of a person includes an eyeball and a cornea. FIG. 3 is a schematic diagram of a cornea map according to an embodiment of the present disclosure. As shown in FIG. 3, the cornea is a membrane-like structure. The cornea is imperceptibly textured and bumpy. The surface of the cornea is not quite smooth, and has a bumpy texture.

In this embodiment of this disclosure, the map is used for simulating the bumpy texture of the cornea. The map may be hand-painted in advance or may be produced by drawing a pattern with an application program.

Step S206: Render the eye model on which the map is provided, to obtain the eye image.

The eye model on which the map is provided is rendered to obtain the eye image. The eye image includes not only an eyeball but also a cornea having a bumpy texture.

The map is provided on the eyeball surface in the eye model to simulate the bumpy texture of the surface of the cornea in the eye, and the eye model on which the map is provided is rendered, to obtain the eye image including both an image of the eyeball and an image of the cornea. In this way, the eye image is closer to real eyes and is more vivid and realistic. In addition, because generation of the eye image does not require a model having a large number of surfaces or a complex program algorithm, when the eye image is displayed on a terminal, operating and calculating requirements of the terminal are lower, operating pressure and calculating pressure of the terminal are relieved, and the efficiency of displaying the eye image is improved.

In a specific example, the eye image generated by using the foregoing eye image generation method may be used in online games and animations. For example, the generated eye image is applied to an online game "Moonlight Blade". The generated eye image is displayed on a character in "Moonlight Blade". The generated image manifests a large number of eye details, and vividly and realistically presents eyes of the character in the game. Eyes simulated by using the eye image are closer to real eyes, and achieve a realistic effect on the game interface, bringing good experience to gamers. The eye image used in the animations enables eyes of a human character or an animal character in the animations to be more realistic and cleverer.

In a process of generating the eye image, the cornea on the eyeball is manifested by using the map. The map used for simulating the cornea covers on the eyeball part in the eye model, enabling the eye model to present the texture of the cornea.

Optionally, the rendering the eye model on which the map is provided includes: obtaining a lighting model for generating reflected light on the eye image, the lighting model being used for outputting reflected light of the eyeball and reflected light of the cornea in the eye model; and generating, according to the reflected light of the eyeball and the reflected light of the cornea output by the lighting model, an eyeball-reflected light image for representing the reflected light of the eyeball and a cornea-reflected light image for representing the reflected light of the cornea, the eyeball-reflected light image including a diffused reflected light image of the eyeball and a specularly reflected light image of the eyeball, and the cornea-reflected light image including a diffused reflected light image of the cornea and a specularly reflected light image of the cornea.

In this embodiment of this application, a process of rendering the eye model on which the map is provided is as follows: The lighting model is obtained, the lighting model being a lighting model based on a plurality of layers of materials, and being capable of outputting the reflected light of the eyeball and the reflected light of the cornea in the eye model. The eyeball-reflected light image and the cornea-reflected light image are generated according to the reflected light of the eyeball and the reflected light of the cornea output by the lighting model. The eyeball-reflected light image indicates the reflected light of the eyeball, and the cornea-reflected light image indicates the reflected light of the cornea. Because the reflected light includes diffused reflected light and specularly reflected light, the generated eyeball-reflected light image includes two images, that is, the diffused reflected light image of the eyeball and the specularly reflected light image of the eyeball. Likewise, the cornea-reflected light image includes two images, that is, the diffused reflected light image of the cornea and the specularly reflected light image of the cornea.

In the existing technology, in a process of rendering an eye model, a lighting model outputs reflected light of an eyeball in the eye model, and generates, according to the reflected light of the eyeball output by the lighting model, an eyeball-reflected light image used for representing the reflected light of the eyeball. Because the eye model in the existing technology does not include a cornea part, the lighting model in the existing technology cannot output reflected light of a cornea, and further cannot generate a cornea-reflected light image according to the reflected light of the cornea. However, a real eye includes an eyeball and a cornea, leading to reflected light of both the eyeball and the cornea. Therefore, in this embodiment of this disclosure, after the map is provided on the eyeball surface of the eyeball part in the eye model to simulate the cornea having the bumpy texture, the lighting model outputs not only the reflected light of the eyeball but also the reflected light of the cornea, and generates the eyeball-reflected light image and the cornea-reflected light image according to the reflected light of the eyeball and the reflected light of the cornea output by the lighting model, which are closer to reflected light from a real eye having an eyeball and a cornea, making the generated eye image more vivid and more realistic.

Optionally, the generating, according to the reflected light of the eyeball and the reflected light of the cornea output by the lighting model, an eyeball-reflected light image used for representing the reflected light of the eyeball and a cornea-reflected light image used for representing the reflected light of the cornea includes: receiving an instruction for adjusting the reflected light of the eyeball and the reflected light of the cornea output by the lighting model; adjusting, according to the received instruction, the reflected light of the eyeball and the reflected light of the cornea output by the lighting model; generating the eyeball-reflected light image according to the adjusted reflected light of the eyeball; and generating the cornea-reflected light image according to the adjusted reflected light of the cornea. The instruction is used for adjusting a light flux of diffused reflected light in the reflected light of the eyeball to be changed in a same direction, i.e., positively correlated, with a light flux of specularly reflected light in the reflected light of the eyeball, and/or adjusting a light flux of diffused reflected light in the reflected light of the cornea to be changed in a same direction, i.e, positively correlated, with a light flux of specularly reflected light in the reflected light of the cornea.

As an example, the instruction is used for instructing at least one of the following: adjusting the light flux of the diffused reflected light in the reflected light of the eyeball to increase as the light flux of the specularly reflected light in the reflected light of the eyeball increases, adjusting the light flux of the diffused reflected light in the reflected light of the cornea to increase as the light flux of the specularly reflected light in the reflected light of the cornea increases, adjusting the light flux of the diffused reflected light in the reflected light of the eyeball to decrease as the light flux of the specularly reflected light in the reflected light of the eyeball decreases, and adjusting the light flux of the diffused reflected light in the reflected light of the cornea to decrease as the light flux of the specularly reflected light in the reflected light of the cornea decreases.

In the existing technology, a light flux of diffused reflected light in reflected light of an eyeball of a character in an online game changes inversely with a light flux of specularly reflected light in the reflected light of the eyeball. That is, when a light flux of one part increases, a light flux of the other part decreases, and the sum of the light fluxes of the two parts is conserved (that is, the sum of the light fluxes of the two parts is a conserved quantity). In this case in the existing technology, a problem prone to occur is: when the light fluxes of the two parts change and a light flux of one part increases, a light flux of the other part essentially decreases, and as a result, a difference/ratio of the light fluxes of the two parts may increase. As a result, the part whose light flux is relatively small is not easy to sense visually. In an extreme case, it is possibly that a light flux of one part is close to the conserved quantity, and a light flux of the other part is close to zero. As a result, the part whose light flux is close to zero is difficult to sense visually. For example, it is assumed that the light flux of the specularly reflected light in the reflected light of the eyeball is $T_1$, the light flux of the diffused reflected light in the reflected light of the eyeball is $T_2$, and the sum of $T_1$ and $T_2$ is $T_0$ (that is, the foregoing conserved quantity). When $T_1=0.9T_0$, $T_2=0.1T_0$, and $T_1$ is nine times $T_2$. That is, the light flux of the specularly reflected light in the reflected light of the eyeball is nine times the light flux of the diffused reflected light in the reflected light of the eyeball. In this case, it is difficult to sense the diffused reflected light in the reflected light of the eyeball visually, affecting realistic effect of eyes of the character in the online game.

In this embodiment of this disclosure, to enable the eye image to manifest both the diffused reflected light in the reflected light and the specularly reflected light in the reflected light, the light flux of the diffused reflected light is adjusted. Thus, when the light flux of the specularly reflected light is relatively large, manifestation of the diffused reflected light may not be obscured. So that the diffused reflected light can also be obviously manifested in the eye image. Therefore, the generated eye image ensures that both the diffused reflected light in the reflected light of the eyeball and the cornea and the specularly reflected light in the reflected light of the eyeball and the cornea can be sensed visually, which is close to a case where light may be reflected from a real eyeball and cornea of a real eye. Therefore, realistic effects of eyes of a character in the online game are increased.

Optionally, after the reflected light of the eyeball and the reflected light of the cornea output by the lighting model are adjusted according to the received instruction, the eyeball-reflected light image is generated according to the adjusted reflected light of the eyeball, and the cornea-reflected light image is generated according to the adjusted reflected light of the cornea.

Specifically, eye-reflected light is the sum of diffused reflected light of an eye and specularly reflected light of the eye. The diffused reflected light may be calculated by using the following formula (1):

$$\int_\Omega L(l)(n\cdot l)dl \qquad \text{formula (1)}.$$

and the specularly reflected light may be calculated by using the following formula (2):

$$\frac{F(l, h)G(l, v, h)D(h)}{4(n\cdot l)(n\cdot v)}. \qquad \text{formula (2)}$$

where L being light in all directions, l being an angle, n being a normal direction, F being a Fresnel part, G being a model component of a surface having a bumpy texture, h being a center line of a sight line and a light direction, v being an angle of the sight line, D being a distribution component and being used for representing luminance distribution on a bumpy surface, 4(n·l) being an angle operator, and Ω being an angle range.

After the diffused reflected light and the specularly reflected light are calculated by using the foregoing formula (1) and formula (2), both the specularly reflected light and the diffused reflected light can be manifested.

Optionally, before the rendering the eye model on which the map is provided, the eye image generation method provided in this embodiment of this disclosure further includes: obtaining an additional model used for manifesting the eye image and combining with the eye model to manifest a structure of the eye; and combining the additional model with the eye model. The additional model is used for manifesting details in the eye, for example, eyelashes and tear glands. A combination of the additional model and the eye model is used for generating the eye image, so that details of the eye in the eye image are richer, and can represent more details of real eyes, increasing reality and vividness of the eye image. The additional model may be hand-painted in advance or may be made by using an application program for drawing a pattern.

Optionally, the additional model includes at least one of an eyelash model, an eye shadow model, or a tear gland and secretion model. The eyelash model is used for adding the effect of eyelashes to the eye model, so that the generated eye image has eyelashes. The eye shadow model is used for adding the effect of an eye shadow to the eye model, to simulate a shadow of a white in the eye. The tear gland and secretion model is used for adding a tear gland and a secretion to the eye model, so that the generated eye image has a tear gland and a secretion.

An additional model may be used for producing eye images of different characters. When eye images of different characters are being produced, a same additional model may be invoked repeatedly. Eye images of different characters may also be produced by using different additional models. In an optional embodiment, eye images of different characters are produced by using different additional models according to the gender, the age, and personalities of the different characters in a game. In this way, the eye image of the character in the game not only is vivid and realistic but also can manifest characteristics of the character, so as to simulate eyes of a character in the real world realistically.

Figure 4A:
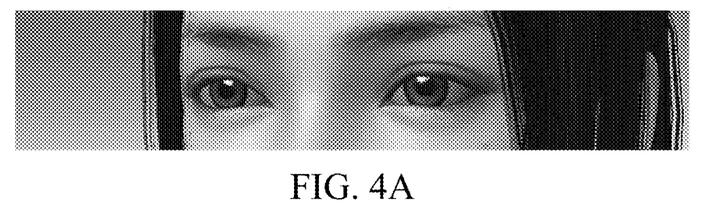
FIG. 4A is a diagram showing an effect of an eye model in the existing technology.

FIG. 4A is a diagram showing an effect of an eye model in the existing technology.

Figure 4B:
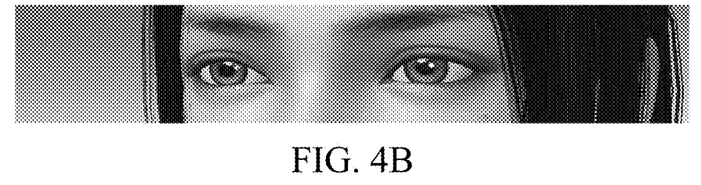
FIG. 4B is a diagram showing an effect of an eye model obtained after a map is provided on an eyeball surface of an eyeball part in the eye model in FIG. 4A.

FIG. 4B is a diagram showing an effect of an eye model obtained after a map is provided on an eyeball surface of an eyeball part in the eye model in FIG. 4A. It can be seen that after the map is provided on the eyeball surface of the eyeball part in the eye model, both a white and a cornea have a reflected light image, so that eyes become brighter and more sparkling, and eyeballs are cleverer and more realistic.

Figure 4C:
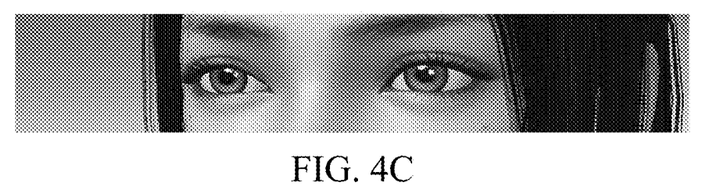
FIG. 4C is a diagram showing an effect of an eye model obtained after an eyelash model is additionally added to the eye model in FIG. 4B.

FIG. 4C is a diagram showing an effect of an eye model obtained after an eyelash model is added to the eye model in FIG. 4B. A complete patch is combined with a refined transparent map to implement the natural eyelash effect, so that eyelashes look real. After the eyelash model is added, a degree of realistic effect of eyes of a character is improved greatly.

Figure 4D:
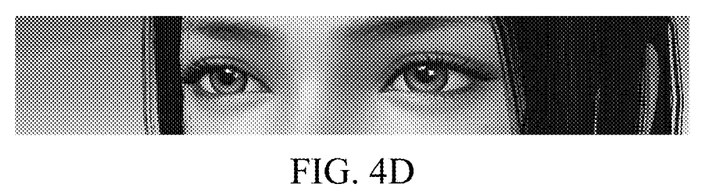
FIG. 4D is a diagram showing an effect of an eye model obtained after an eye shadow model is additionally added to the eye model in FIG. 4C.

FIG. 4D is a diagram showing an effect of an eye model obtained after an eye shadow model is added to the eye model in FIG. 4C. Compared with FIG. 4C, in FIG. 4D, whites of the character have small shadows, and the whites are no longer pure white and look more realistic.

Figure 4E:
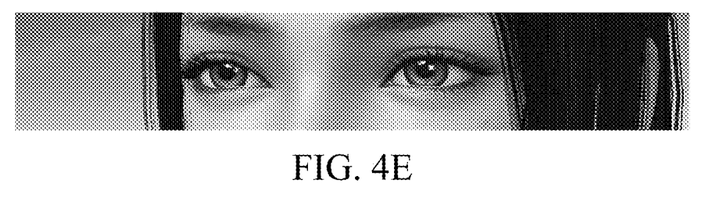
FIG. 4E is a diagram showing an effect of an eye model obtained after a tear gland and secretion model is additionally added to the eye model in FIG. 4D.

FIG. 4E is a diagram showing an effect of an eye model obtained after a tear gland and secretion model is added to the eye model in FIG. 4D. Compared with FIG. 4D, in FIG. 4E, a white structure, for example and not limiting, a line, is added at the bottom of each eye of the character. This is a simulation of secretions, so that the eyes look more realistic and clever. The effects of eye shadows and tear glands and secretions thereof are achieved by adding a layer on the eyeball. The layer on the eyeball may be a layer of eye shell on the eyeball.

The eye image generated in the eye image generation method provided in this embodiment of this disclosure is applied to a character in an online game, so that not only eyes of the character look very vivid and realistic but also a calculating capability of a rendering program and a bearing capability of a client are fully considered. Therefore, the online game is smoother when running on the client.

It should be noted that in the foregoing embodiment, the eye model is processed stepwise by providing the map on the eyeball surface in the eye model, adding the eyelash model, adding the eye shadow model, and adding the tear gland and secretion model. In other embodiments, processing is not limited to such a sequence and is not limited to the foregoing mentioned additional models.

It should be noted that, for ease of description, the foregoing method embodiments are described as a series of action combinations. However, a person skilled in the art should understand that the present disclosure is not limited to the described sequence of the actions, because some steps may be performed in another sequence or performed at the same time according to the present disclosure. In addition, a person skilled in the art should also know that all the embodiments described in this specification are preferred embodiments, and the related actions and modules are not necessarily required in the present disclosure.

Through the descriptions of the preceding embodiments, persons skilled in the art may understand that the methods according to the foregoing embodiments may be implemented by hardware only or by software and a necessary universal hardware platform. However, in most cases, using software and a necessary universal hardware platform are preferred. Based on such an understanding, the technical solutions of the present disclosure essentially, or the part contributing to the prior art may be implemented in a form of a software product. The computer software product is stored in a storage medium (such as a ROM/RAM, a magnetic disk, or an optical disc) and includes several instructions for instructing a terminal device (which may be a mobile phone, a computer, a server, a network device, or the like) to perform the methods described in the embodiments of the present disclosure.

Embodiment 2

Figure 5:
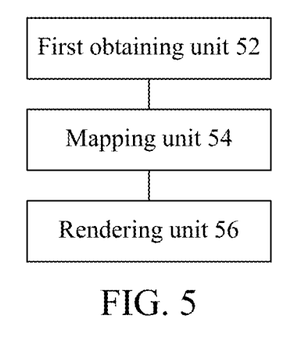
FIG. 5 is a schematic diagram of an eye image generation apparatus according to an embodiment of the present disclosure.

According to this embodiment of the present disclosure, an eye image generation apparatus configured to perform the foregoing eye image generation method is further provided. FIG. 5 is a schematic diagram of the eye image generation apparatus according to this embodiment of the present disclosure. The eye image generation apparatus includes a memory and a processor in communication of the memory. As shown in FIG. 5, the apparatus includes a first obtaining unit 52, a mapping unit 54, and a rendering unit 56.

The first obtaining unit 52 is configured to obtain an eye model for generating an eye image, the eye model including an eyeball part used for expressing the eyeball of an eye.

The mapping unit 54 is configured to provide a map on an eyeball surface of the eyeball part in the eye model, the map covering the eyeball part in the eye model, and the map being used for simulating a bumpy texture of a surface of a cornea in the eye.

The rendering unit 56 is configured to render the eye model on which the map is provided, to obtain the eye image.

Optionally, the rendering unit 56 includes an obtaining subunit and a generation subunit. The obtaining subunit is configured to obtain a lighting model used for generating reflected light on the eye image, the lighting model being used for outputting reflected light of the eyeball and reflected light of the cornea in the eye model. The generation subunit is configured to generate, according to the reflected light of the eyeball and the reflected light of the cornea output by the lighting model, an eyeball-reflected light image used for representing the reflected light of the eyeball and a cornea-reflected light image used for representing the reflected light of the cornea. The eyeball-reflected light image includes a diffused reflected light image of the eyeball and a specularly reflected light image of the eyeball. The cornea-reflected light image includes a diffused reflected light image of the cornea and a specularly reflected light image of the cornea.

Optionally, the generation subunit includes a receiving module and an adjustment module. The receiving module is configured to receive an instruction used for adjusting the reflected light of the eyeball and the reflected light of the cornea output by the lighting model. The instruction is used for adjusting a light flux of diffused reflected light in the reflected light of the eyeball to be changed in a same direction, i.e., positively correlated, with a light flux of specularly reflected light in the reflected light of the eyeball, and/or adjusting a light flux of diffused reflected light in the reflected light of the cornea to be changed in a same direction, i.e., positively correlated, with a light flux of specularly reflected light in the reflected light of the cornea. The adjustment module is configured to: adjust, according to the received instruction, the reflected light of the eyeball and the reflected light of the cornea output by the lighting model, generate the eyeball-reflected light image according to the adjusted reflected light of the eyeball, and generate the cornea-reflected light image according to the adjusted reflected light of the cornea.

Optionally, before the rendering unit 56 renders the eye model on which the map is provided, the eye image generation apparatus provided in this embodiment of this disclosure further includes a second obtaining unit and a combination unit. The second obtaining unit is configured to obtain an additional model used for manifesting the eye image, the additional model being used for combining with the eye model to manifest a structure of the eye. The combination unit is configured to combine the additional model with the eye model.

The eye image generated by the eye image generation apparatus provided in this embodiment of this application may be applied to, for example, a character in an online game, so that not only eyes of the character look very vivid and realistic but also a calculating capability of a rendering program and a bearing capability of a client are fully considered. Therefore, the online game is smoother when running on the client.

It should be noted that for brevity, the foregoing descriptions of the eye image generation apparatus are relatively simple. For functions and operations of the units of the apparatus, refer to corresponding content described in Embodiment 1.

Embodiment 3

Figure 6:
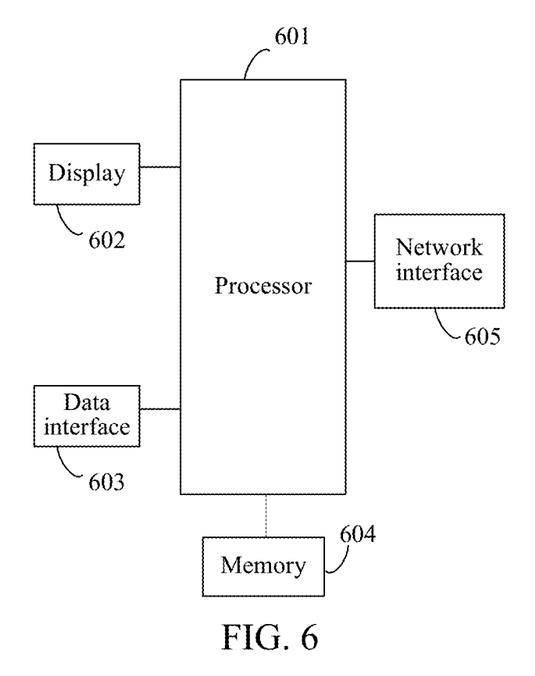
FIG. 6 is a hardware structure diagram of a server according to an embodiment of the present disclosure.

According to this embodiment of the present disclosure, a server configured to perform the foregoing eye image generation method is further provided. FIG. 6 is a hardware structure diagram of the server according to this embodiment of the present disclosure. As shown in FIG. 6, the server mainly includes a processor 601, a display 602, a data interface 603, a memory 604, and a network interface 605.

The display 602 is mainly configured to display an image, for example, a game interface. The game interface displays human eyes generated by using the eye image generation method in the foregoing embodiments.

The data interface 603 is mainly configured to transmit, to the processor 601 by means of data transmission, a control instruction input by a user, to provide data support for a generated eye image.

The memory 604 is mainly configured to store instruction code used for performing the method in the present disclosure, and information such as a character, an eye image of the character, the control instruction input by the user, and a game progress related when the method in the present disclosure is performed.

The network interface 605 is mainly configured to: perform network communication with the external, provide data support for the generated eye image, and transmit the generated eye image to other servers.

The processor 601 is mainly configured to perform various operation steps in the method in Embodiment 1. For brevity, details are not described in this embodiment.

Embodiment 4

This embodiment of the present disclosure further provides a storage medium. Optionally, in this embodiment, the storage medium may be configured to store program code for the eye image generation method in the embodiments of the present disclosure. For brevity, details are not described in this embodiment.

Optionally, in this embodiment, the storage medium may be located on at least one of a plurality of network devices in a network such as a mobile communications network, a wide area network, a metropolitan area network, or a local area network.

The sequence numbers of the foregoing embodiments of the present disclosure are merely for description purpose but do not indicate the preference of the embodiments.

When the integrated unit in the foregoing embodiment is implemented in a form of a software functional module and sold or used as an independent product, the integrated unit may be stored in the foregoing computer-readable storage medium. Based on such an understanding, the technical solutions of the present disclosure essentially, or the part contributing to the prior art, or all or some of the technical solutions may be implemented in a form of a software product. The computer software product is stored in a storage medium and includes a set of instructions for instructing one or more computer devices (which may be a personal computer, a server, a network device, or the like) to perform all or some of the steps of the methods described in the embodiments of the present disclosure.

In the foregoing embodiments of the present disclosure, descriptions of the embodiments have different emphases, and as for parts that are not described in detail in one embodiment, reference can be made to the relevant description of the other embodiments.

In the several embodiments provided in the present application, it should be understood that the disclosed client may be implemented in other manners. The described apparatus embodiments are merely exemplary. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electronic or other forms.

The units described as separate parts may or may not be physically separate, and the parts displayed as units may or may not be physical units, may be located in one position, or may be distributed on a plurality of network units. Some or all of the units may be selected according to actual needs to achieve the objectives of the solutions of the embodiments.

In addition, function units in the embodiments of the present disclosure may be integrated into one processing unit, or each of the units may exist alone physically, or two or more units may be integrated into one unit. The integrated unit may be implemented in a form of hardware, or may be implemented in a form of a software function unit.

The above descriptions are merely preferred implementations of the present disclosure, and it should be noted that, a person of ordinary skill in the art may make various improvements and refinements without departing from the spirit of the present disclosure. All such modifications and refinements should also be intended to be covered by the present disclosure.

What is claimed is:

1. A method for generating an eye image, the method comprising:
   obtaining, by a device comprising a memory and a processor in communication with the device, an eye model for generating an eye image of an eye, the eye model comprising an eyeball part for generating an eyeball image;
   providing, by the device, a map on an eyeball surface of the eyeball part in the eye model, wherein the map being hand painted or produced by an application program in advance, the map covering the eyeball part in the eye model, and the map being used for simulating a texture of a surface of a cornea of the eye;
   obtaining, by the device, additional models according to a gender, an age, and personalities of a character for manifesting the eye image and for combining with the eye model to manifest a structure of the eye, wherein the additional models comprises an eyelash model, an eye shadow model, and a tear gland and secretion model;
   combining, by the device, the additional models with the eye model; and
   rendering, by the device, the eye model on which the map is pasted to obtain the eye image.

2. The method according to claim 1, wherein the rendering the eye model on which the map is provided to obtain the eye image comprises:
   obtaining, by the device, a lighting model for generating reflected light on the eye image, the lighting model being used for generating reflected light of the eyeball and reflected light of the cornea in the eye model; and
   generating, by the device according to the reflected light of the eyeball and the reflected light of the cornea generated by the lighting model, an eyeball-reflected light image used for representing the reflected light of the eyeball and a cornea-reflected light image used for representing the reflected light of the cornea, wherein:
      the eyeball-reflected light image comprises a diffused reflected light image of the eyeball and a specularly reflected light image of the eyeball, and
      the cornea-reflected light image comprises a diffused reflected light image of the cornea and a specularly reflected light image of the cornea.

3. The method according to claim 2, wherein the generating, according to the reflected light of the eyeball and the reflected light of the cornea generated by the lighting model, the eyeball-reflected light image used for representing the reflected light of the eyeball and the cornea-reflected light image used for representing the reflected light of the cornea comprises:
   receiving, by the device, an instruction for adjusting the reflected light of the eyeball and the reflected light of the cornea generated by the lighting model;
   adjusting, by the device according to the instruction, the reflected light of the eyeball and the reflected light of the cornea generated by the lighting model;
   generating, by the device, the eyeball-reflected light image according to the adjusted reflected light of the eyeball; and
   generating, by the device, the cornea-reflected light image according to the adjusted reflected light of the cornea.

4. The method according to claim 3, wherein:
   the instruction is used for adjusting a light flux of diffused reflected light in the reflected light of the eyeball to be changed in positive correlation with a light flux of specularly reflected light in the reflected light of the eyeball, or adjusting a light flux of diffused reflected light in the reflected light of the cornea to be changed in positive correlation with a light flux of specularly reflected light in the reflected light of the cornea.

5. The method according to claim 1, the method further comprising:
   providing, by the device, the eye image to be used for a character in an online game.

6. An apparatus for generating an eye image, the apparatus comprising:
   a memory storing instructions; and
   a processor in communication with the memory, wherein, when the processor executes the instructions, the processor is configured to cause the apparatus to:
      obtain an eye model for generating an eye image of an eye, the eye model comprising an eyeball part for generating an eyeball image;
      provide a map on an eyeball surface of the eyeball part in the eye model, wherein the map being hand painted or produced by an application program in advance, the map covering the eyeball part in the eye model, and the map being used for simulating a texture of a surface of a cornea of the eye;

obtain additional models according to a gender, an age, and personalities of a character for manifesting the eye image and for combining with the eye model to manifest a structure of the eye, wherein the additional models comprises an eyelash model, an eye shadow model, and a tear gland and secretion model;

combine the additional models with the eye model; and render the eye model on which the map is pasted to obtain the eye image.

7. The apparatus according to claim 6, wherein, when the processor is configured to cause the apparatus to render the eye model on which the map is provided to obtain the eye image, the processor is configured to cause the apparatus to:

obtain a lighting model for generating reflected light on the eye image, the lighting model being used for generating reflected light of the eyeball and reflected light of the cornea in the eye model; and generate, according to the reflected light of the eyeball and the reflected light of the cornea generated by the lighting model, an eyeball-reflected light image used for representing the reflected light of the eyeball and a cornea-reflected light image used for representing the reflected light of the cornea, wherein:

the eyeball-reflected light image comprises a diffused reflected light image of the eyeball and a specularly reflected light image of the eyeball, and the cornea-reflected light image comprises a diffused reflected light image of the cornea and a specularly reflected light image of the cornea.

8. The apparatus according to claim 7, wherein, when the processor is configured to cause the apparatus to generate, according to the reflected light of the eyeball and the reflected light of the cornea generated by the lighting model, the eyeball-reflected light image used for representing the reflected light of the eyeball and the cornea-reflected light image used for representing the reflected light of the cornea, the processor is configured to cause the apparatus to: receive an instruction for adjusting the reflected light of the eyeball and the reflected light of the cornea generated by the lighting model;

adjust, according to the instruction, the reflected light of the eyeball and the reflected light of the cornea generated by the lighting model;

generate the eyeball-reflected light image according to the adjusted reflected light of the eyeball; and generate the cornea-reflected light image according to the adjusted reflected light of the cornea.

9. The apparatus according to claim 8, wherein:

the instruction is used for adjusting a light flux of diffused reflected light in the reflected light of the eyeball to be changed in positive correlation with a light flux of specularly reflected light in the reflected light of the eyeball, or adjusting a light flux of diffused reflected light in the reflected light of the cornea to be changed in positive correlation with a light flux of specularly reflected light in the reflected light of the cornea.

10. The apparatus according to claim 6, wherein, when the processor executes the instructions, the processor is configured to further cause the apparatus to:

provide the eye image to be used for a character in an online game.

11. A non-transitory computer readable storage medium storing instructions, the instructions, when executed by a processor, cause the processor to perform:

obtaining an eye model for generating an eye image of an eye, the eye model comprising an eyeball part for generating an eyeball image;

providing a map on an eyeball surface of the eyeball part in the eye model, wherein the map being hand painted or produced by an application program in advance, the map covering the eyeball part in the eye model, and the map being used for simulating a texture of a surface of a cornea of the eye;

obtaining, by the device, additional models according to a gender, an age, and personalities of a character for manifesting the eye image and for combining with the eye model to manifest a structure of the eye, wherein the additional models comprises an eyelash model, an eye shadow model, and a tear gland and secretion model;

combining, by the device, the additional models with the eye model; and rendering the eye model on which the map is pasted to obtain the eye image.

12. The non-transitory computer readable storage medium according to claim 11, wherein, when the instructions cause the processor to perform the rendering the eye model on which the map is provided to obtain the eye image, the instructions cause the processor to perform:

obtaining a lighting model for generating reflected light on the eye image, the lighting model being used for generating reflected light of the eyeball and reflected light of the cornea in the eye model; and generating, according to the reflected light of the eyeball and the reflected light of the cornea generated by the lighting model, an eyeball-reflected light image used for representing the reflected light of the eyeball and a cornea-reflected light image used for representing the reflected light of the cornea, wherein:

the eyeball-reflected light image comprises a diffused reflected light image of the eyeball and a specularly reflected light image of the eyeball, and the cornea-reflected light image comprises a diffused reflected light image of the cornea and a specularly reflected light image of the cornea.

13. The non-transitory computer readable storage medium according to claim 12, wherein, when the instructions cause the processor to perform the generating, according to the reflected light of the eyeball and the reflected light of the cornea generated by the lighting model, the eyeball-reflected light image used for representing the reflected light of the eyeball and the cornea-reflected light image used for representing the reflected light of the cornea, the instructions cause the processor to perform:

receiving an instruction for adjusting the reflected light of the eyeball and the reflected light of the cornea generated by the lighting model;

adjusting, according to the instruction, the reflected light of the eyeball and the reflected light of the cornea generated by the lighting model;

generating the eyeball-reflected light image according to the adjusted reflected light of the eyeball; and generating the cornea-reflected light image according to the adjusted reflected light of the cornea.

14. The non-transitory computer readable storage medium according to claim 13, wherein:

the instruction is used for adjusting a light flux of diffused reflected light in the reflected light of the eyeball to be changed in positive correlation with a light flux of specularly reflected light in the reflected light of the eyeball; and the instruction is used for adjusting a light flux of diffused reflected light in the reflected light of the cornea to be changed in positive correlation with a light flux of specularly reflected light in the reflected light of the cornea.

* * * * *